US008355030B2

(12) United States Patent
Lin

(10) Patent No.: US 8,355,030 B2
(45) Date of Patent: Jan. 15, 2013

(54) DISPLAY METHODS FOR HIGH DYNAMIC RANGE IMAGES AND USER INTERFACES FOR THE SAME

(75) Inventor: Tsung-Wei Lin, Taipei (TW)

(73) Assignee: Corel Corporation, Ottawa (CA)

( * ) Notice: Subject to any disclaimer, the term of this patent is extended or adjusted under 35 U.S.C. 154(b) by 1036 days.

(21) Appl. No.: 11/979,503

(22) Filed: Nov. 5, 2007

(65) Prior Publication Data

US 2008/0130994 A1 Jun. 5, 2008

Related U.S. Application Data

(63) Continuation-in-part of application No. 11/030,083, filed on Jan. 7, 2005, now abandoned.

(51) Int. Cl.
*G09G 5/00* (2006.01)
*G06K 9/00* (2006.01)

(52) U.S. Cl. ........................................ 345/617; 382/169

(58) Field of Classification Search ........................ None
See application file for complete search history.

(56) References Cited

U.S. PATENT DOCUMENTS

| | | | |
|---|---|---|---|
| 5,828,793 A | 10/1998 | Mann | |
| 6,014,165 A | 1/2000 | McIntyre | |
| 6,418,245 B1 | 7/2002 | Udagawa | |
| 6,753,876 B2 | 6/2004 | Brooksby | |
| 6,825,884 B1 | 11/2004 | Horiuchi | |
| 6,850,642 B1* | 2/2005 | Wang | 382/169 |
| 6,879,731 B2 | 4/2005 | Kang | |
| 7,283,654 B2* | 10/2007 | McLain | 382/128 |
| 2002/0186224 A1 | 12/2002 | Debevec et al. | |
| 2004/0218830 A1 | 11/2004 | Kang et al. | |
| 2006/0192878 A1* | 8/2006 | Miyahara et al. | 348/333.01 |
| 2009/0303249 A1* | 12/2009 | Debevec et al. | 345/617 |

OTHER PUBLICATIONS

Adobe Photoshop 6.0 User Guide; Adobe systems Inc. 2000.*
Debevec and Malik, "Recovering High Dynamic Range Radiance Maps from Photographs", International Conference on Computer Graphics and Interactive Techniques, Proceedings of the 24th annual conference on Computer graphics and interactive techniques, pp: 369-378, 1997, ISBN: 0-89791-896-7.*
"Gustave Le Gray—Photographer" J. Paul Getty Museum Exhibition Jul. 9-Sep. 29, 2002, http://www.getty.edu/art/exhibitions/le_gray/.
G.W. Larson "Overcoming Gamut and Dynamic Range Limitations in Digital Images" in Proc. of the Sixth Color Imaging Conference, Nov. 1998.
G. Ward "High Dynamic Range Image Examples" http://www.anyhere.com/gward/hdrenc/pages/originals.html Dec. 14, 2003.
MediaCybernetics ImagePro—Image Processing Software http://replay.waybackmachine.org/20040318224259/http://support.mediacy.com/answers/showquestion.asp?faq=35&fldAuto=267, 2005.
R.G. Littlejohn et al "Generalized Radiance and Measurement" J. Opt. Soc. America A, vol. 12, pp. 2736-2743, 1995.

(Continued)

*Primary Examiner* — Daniel Washburn
*Assistant Examiner* — Donna Ricks
(74) *Attorney, Agent, or Firm* — Patterson & Sheridan LLP

(57) ABSTRACT

Display methods and interfaces for high dynamic range images. High dynamic range images and corresponding histograms are displayed on a display device. The histogram panel displays low dynamic range and high dynamic range data of the images simultaneously. The low dynamic range and high dynamic range data is brightness level of the image pixels.

13 Claims, 3 Drawing Sheets
(3 of 3 Drawing Sheet(s) Filed in Color)

OTHER PUBLICATIONS

R. Fisher et al "Hypermedia Image Processing Reference—Pixel Subtraction" http://homepages.inf.ed.ac.uk/rbf/HIPR2/pixsub.htm, 1997, Wiley, New York.

Blender 3D Creation Software http://www.blender.org/documentation/htmll/x5524.html, Sep. 19, 2007.

3D Buzz Discussion Thread http://www.3dbuzz.com/vbforum/showthread.php?39231-Spotlight-Problems, Jul. 10-13, 2003.

R. Fattal et al "Gradient Domain High Dynamic Range Compression" ACM Transactions on Graphics 2002 pp. 249-256.

G. Qiu "Novel Fast Tone Mapping Operators for High Dynamic Range Images" Feb. 4, 2004.

T. Jyrinki "High Dynamic Range Images" Helsinki University, Telecommunications Software & Multimedia Laboratory, Seminar on Computer Graphics, Spring 2003.

* cited by examiner

DISPLAY METHODS FOR HIGH DYNAMIC RANGE IMAGES AND USER INTERFACES FOR THE SAME

CROSS REFERENCE TO RELATED APPLICATIONS

This is a continuation-in-part application of copending application Ser. No. 11/030,083 filed Jan. 7, 2005 now abandoned.

BACKGROUND

The invention relates to image display, and in particular to display methods for high dynamic range image.

The dynamic range of a scene is expressed by the contrast ratio between its brightest and darkest parts. A low dynamic range image (LDR image) can be displayed on a standard display device because of its smaller dynamic range. Due to the range limitations of LDR images, LDR images cannot represent abundant brightness of real scenes properly. Thus, high dynamic range (HDR) images are necessary. A high dynamic range image (HDR image) is typically generated by combining multiple LDR images of the same scene taken with different exposures. High dynamic range images are broadly employed in image processing systems. Rather than being displayed on a standard display device directly, high dynamic range images require a translation from high dynamic range to low dynamic range for display.

Conventionally, an image panel and histogram panel are arranged on a display device, such as a screen, to display images and corresponding histograms. The conventional histogram panel can only display the brightness of low dynamic range data of the image pixels. FIG. 1 is a diagram of an embodiment of a conventional histogram panel. The conventional histogram panel 5 can only display the brightness of low dynamic range data of the image pixels. Thus, if an image processing system processes high dynamic range images, some image parts cannot be displayed by the conventional histogram panel 5 because of the out-of-range brightness.

For example, if an image processing system comprises an image panel and a conventional histogram panel 5 as shown in FIG. 1, an HDR image may be displayed in the image panel and the brightness data of the image pixels is displayed in the corresponding conventional histogram panel 5. When the displayed image is modified, the histogram panel 5 will be difficult to reflect the actual transformed result due to limited input range of histogram panel.

Thus, methods and interfaces for high dynamic range image display are desirable.

SUMMARY

In an exemplary embodiment of display methods for high dynamic range images, high dynamic range images and corresponding histograms are displayed on a display device. The histogram panel displays transformed low dynamic range and high dynamic range data of the images simultaneously. The low dynamic range and high dynamic range data are the brightness level of the image pixels.

DESCRIPTION OF THE DRAWINGS

The patent or application file contains at least one drawing executed in color. Copies of this patent or patent application publication with color drawing(s) will be provided by the office upon request and payment of the necessary fee.

The present invention can be more fully understood by reading the subsequent detailed description and examples with references made to the accompanying drawings, wherein.

DESCRIPTION

Display methods for high dynamic range images are provided. An image and a histogram panel are displayed on a screen. The image is a high dynamic range image and the histogram panel displays low dynamic range and high dynamic range data of the image, expressed as brightness level of the image pixels. The histogram panel displays a two-dimensional histogram, comprising a first axis, such as X-axis, to display brightness, and a second axis, such as Y-axis, to display pixel counts. The histogram panel changes corresponding histogram of the image when the brightness thereof is adjusted.

Figure 1:
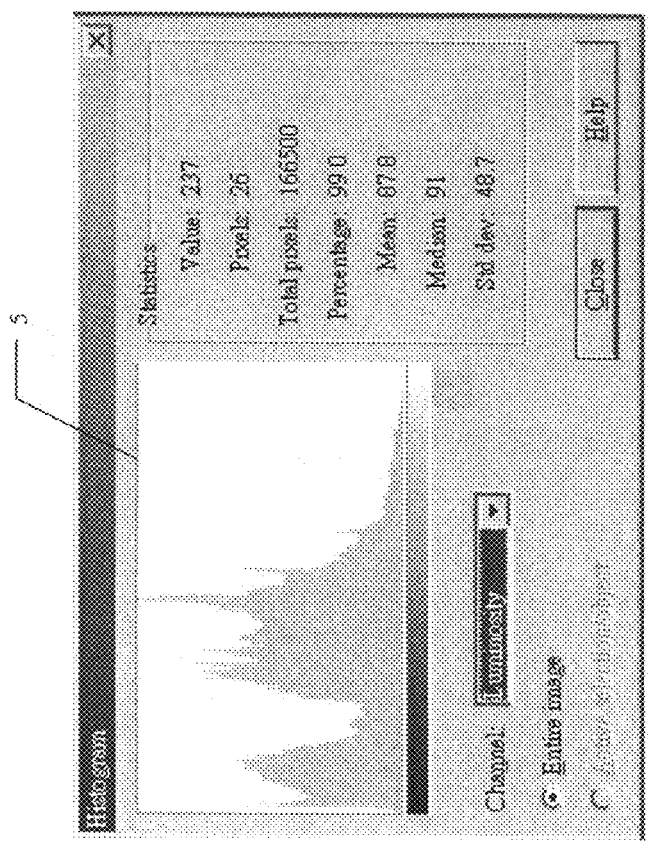
FIG. 1 is a diagram of an embodiment of a conventional histogram panel.
Figure 2:
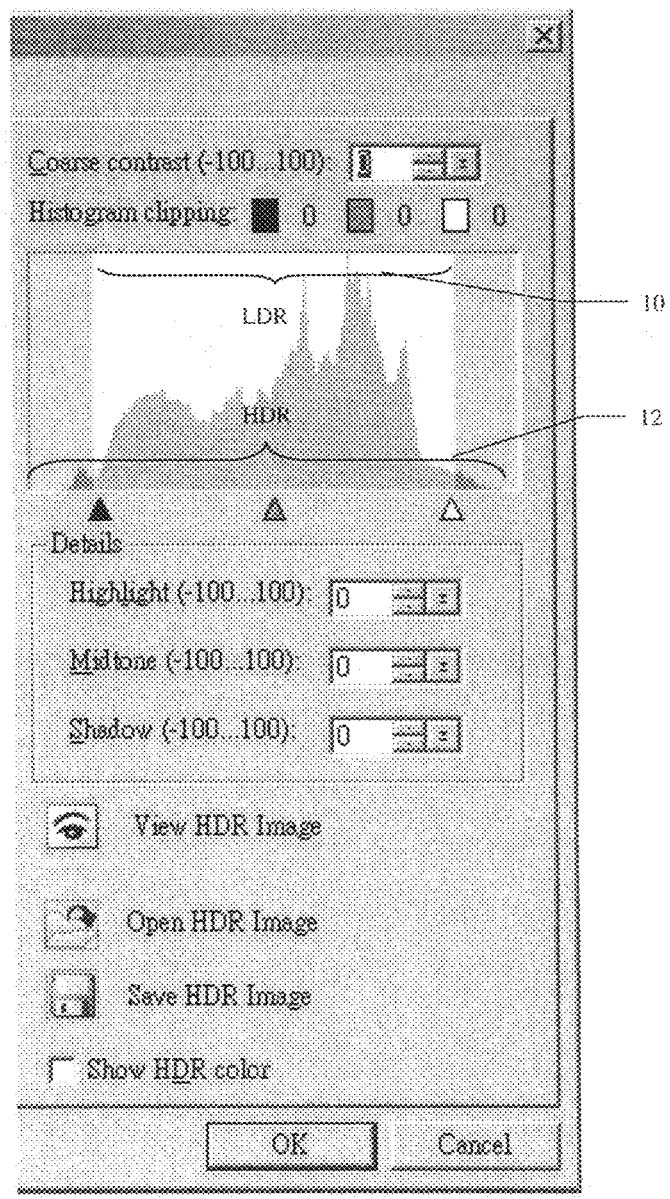
FIG. 2 is a diagram of an embodiment of a histogram panel for high dynamic range images.

FIG. 2 is a diagram of an embodiment of a histogram panel for high dynamic range images. The histogram panel is basically divided into two parts for displaying low dynamic range and high dynamic range data. As shown in FIG. 2, part 10 displays low dynamic range data and part 12 displays high dynamic range data. According to this embodiment, the 'low dynamic range (LDR) data' (part 10) comprises data of pixels specifying brightness ranging from 0~255, and the 'high dynamic range (HDR) data' (part 12) comprises data of pixels specifying brightness lower than 0 and/or higher than 255. When a high dynamic range image is displayed on a screen through a translation, the corresponding histogram is displayed by the histogram panel simultaneously. If the brightness of the image is adjusted, whether partially or entirely, the corresponding histogram changes accordingly. Due to the high dynamic range data display on the screen with the image, users can execute operations or manipulations on the image, such as detailed modifications, according to the high dynamic range data.

Figure 3:
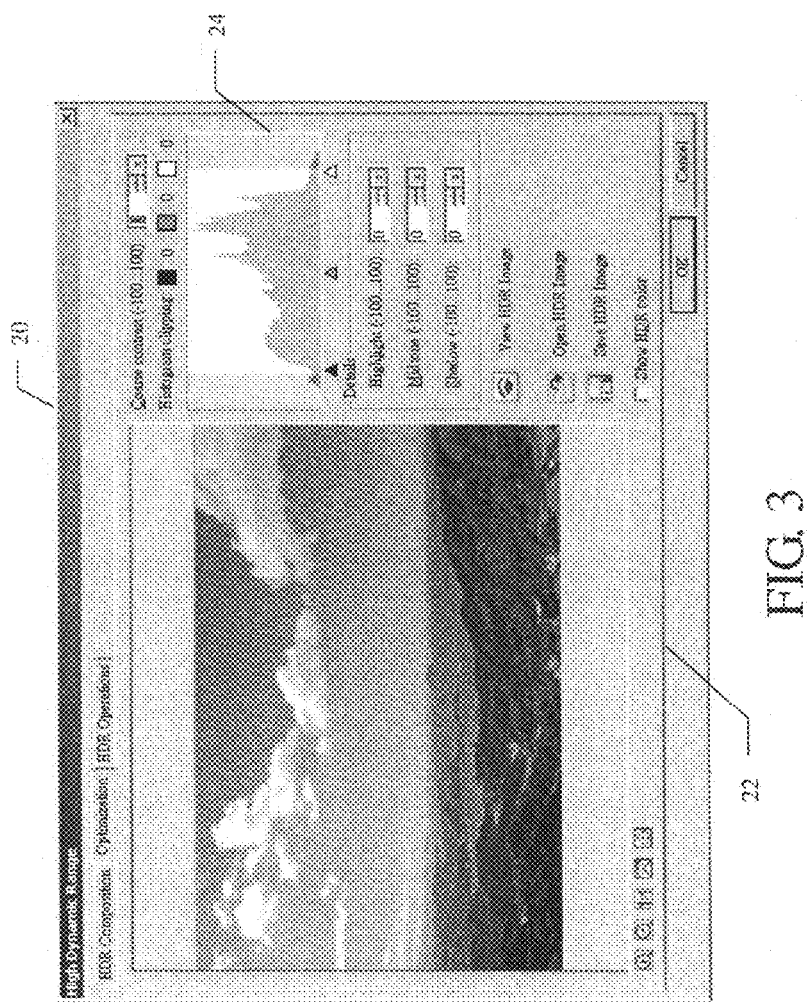
FIG. 3 is a diagram of an embodiment of a user interface for high dynamic range images.

FIG. 3 is a diagram of an embodiment of a user interface for high dynamic range images. The user interface 20 comprises an image panel 22 and a histogram panel 24. The image panel 22 displays a high dynamic range image comprising pixels specifying brightness lower than 0 and/or higher than 255. The histogram panel 24 displays low dynamic range and high dynamic range data of the high dynamic range image, expressed as brightness level of the image pixels. According to this embodiment, the 'low dynamic range (LDR) data' comprises data of pixels specifying brightness ranging from 0~255, and the 'high dynamic range (HDR) data' comprises data of pixels specifying brightness lower than 0 and/or higher than 255. The histogram panel 24 displays a two-dimensional histogram, comprising a first axis to display brightness and a second axis to display pixel counts. In some embodiments, the first axis is X-axis and the second axis is Y-axis. The histogram panel 24 changes when the brightness of the image is adjusted. The user interface 20 is displayed on a display device, such as a screen.

When the brightness of the high dynamic range image displayed on the image panel 22 is adjusted, the histogram displayed on the histogram panel 24 changes accordingly. The displayed high dynamic range data can be provided for other operations. For example, the user interface can be integrated with an image processing system for producing and processing high dynamic range images.

Thus, display methods and interfaces of high dynamic range images may potentially resolve the inconvenience of conventional high dynamic range image display methods. The disclosed methods are particularly useful for processing system for high dynamic range images.

Methods of the present invention, or certain aspects or portions of embodiments thereof, may take the form of program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing and embodiment of the invention. The methods and apparatus of the present invention may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the invention. When implemented on a general-purpose processor, the program code combines with the processor to provide a unique apparatus that operates analogously to specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A display method for high dynamic range images, comprising:
    generating a histogram panel corresponding to brightness levels in an image, wherein the histogram panel includes a first region, a second region, and a third region; and
    displaying the image and the histogram panel on a screen, wherein the image is a high dynamic range image and the histogram panel displays low dynamic range data and high dynamic range data of the image, wherein the low dynamic range data comprises data of pixels in the image specifying a brightness level ranging from 0 to 255 displayed in the second region of the histogram panel, and the high dynamic range data comprises data of pixels in the image specifying a brightness level lower than 0 and higher than 255, displayed, respectively, in the first and third regions of the histogram panel.

2. The display method for high dynamic range images as claimed in claim 1, wherein the histogram panel displays a two-dimensional histogram, comprising a first axis to display brightness and a second axis to display pixel counts.

3. The display method for high dynamic range images as claimed in claim 1, wherein the histogram panel changes the histogram of the image when the brightness thereof is adjusted.

4. A user interface for high dynamic range images, comprising:
    an image panel, displaying a high dynamic range image; and
    a histogram panel, displaying low dynamic range data and high dynamic range data of the high dynamic range image, wherein the histogram panel includes a first region, a second region, and a third region, wherein the low dynamic range data comprises data of pixels in the image specifying a brightness level ranging from 0 to 255 displayed in the second region of the histogram panel, and the high dynamic range data comprises data of pixels in the image specifying a brightness level lower than 0 and/or higher than 255, displayed, respectively, in the first and third regions of the histogram panel.

5. The user interface for high dynamic range images as claimed in claim 4, wherein the histogram panel displays a two-dimensional histogram, comprising a first axis to display brightness and a second axis to display pixel counts.

6. The user interface for high dynamic range images as claimed in claim 5, wherein the histogram panel changes the histogram of the image when the brightness thereof is adjusted.

7. The user interface for high dynamic range images as claimed in claim 5, wherein the user interface is displayed on a display device.

8. A method comprising:
    retrieving from a non-volatile tangible computer readable memory a predetermined portion of an image stored in a predetermined format characterized by a first dynamic range for presentation to a user on a display having a second dynamic range, the first dynamic range exceeding the second dynamic range;
    generating, with a processor, first dynamic range data relating to brightness levels of pixels within the image retrieved;
    processing the image retrieved with the processor to generate a display image in dependence upon at least the second dynamic range; and
    displaying, on the display, the first dynamic range data and the display image, wherein the first dynamic range data includes a first region presenting data related to the brightness levels of the pixels below that of the second dynamic range, a second region presenting data related to the brightness levels of the pixels within the second dynamic range, and a third region presenting data related to the brightness levels of the pixels above that of the second dynamic range, wherein the data related to the brightness levels of the pixels within the second dynamic range specifies brightness levels ranging from 0 to 255, wherein the first region specifies data related to pixels with brightness levels lower than 0, relative to the second dynamic range, and wherein the third region specifies data related to pixels with brightness levels greater than 255, relative to the second dynamic range.

9. The method according to claim 8 further comprising:
    generating and displaying on the display a histogram panel comprising a two-dimensional histogram with a first axis to display the brightness levels in the first, second, and third regions, and a second axis to display pixel counts; and
    displaying the first and second dynamic range data in the histogram panel.

10. The method according to claim 8 further comprising:
    applying a graphic imaging process to the image retrieved with the processor to generate a processed image;
    generating with the processor modified first dynamic range data relating to the brightness of the pixels in the processed image;
    processing the processed image with the processor to generate a modified display image for presentation to the user on the display in dependence upon at least the second dynamic range; and
    generating with the processor second dynamic range data relating to the brightness of the pixels within the modified display image.

11. A non-transitory tangible computer readable medium encoding a computer program for executing on a computer system a computer process, the computer process comprising:
   retrieving from a non-volatile computer readable memory a predetermined portion of an image stored in a predetermined format characterized by a first dynamic range for presentation to a user on a display having a second dynamic range, the first dynamic range exceeding the second dynamic range;
   generating with a processor first dynamic range data relating to brightness of pixels within the image retrieved;
   processing the image retrieved with the processor to generate a display image in dependence upon at least the second dynamic range; and
   displaying on the display the first dynamic range data and the display image, wherein the first dynamic range data includes a first region presenting data related to the brightness levels of the pixels below that of the second dynamic range, a second region presenting data related to the brightness levels of the pixels within the second dynamic range, and a third region presenting data related to the brightness levels of the pixels above that of the second dynamic range, wherein the data related to the brightness levels of the pixels within the second dynamic range specifies brightness levels ranging from 0 to 255, wherein the first region specifies data related to pixels with brightness levels lower than 0, relative to the second dynamic range, and wherein the third region specifies data related to pixels with brightness levels greater than 255, relative to the second dynamic range.

12. The non-transitory tangible computer readable medium of claim 11, wherein the computer process further comprises;
   generating and displaying on the display a histogram panel comprising a two-dimensional histogram with a first axis to display the brightness levels in the first, second, and third regions, and a second axis to display pixel counts; and
   displaying the first and second dynamic range data in the histogram panel.

13. The non-transitory tangible computer readable medium of claim 11, wherein the computer process further comprises;
   applying a graphic imaging process to the image retrieved with the processor to generate a processed image;
   generating with the processor modified first dynamic range data relating to the brightness of the pixels in the processed image;
   processing the processed image with the processor to generate a modified display image for presentation to the user on the display in dependence upon at least the second dynamic range; and
   generating with the processor second dynamic range data relating to the brightness of the pixels within the modified display image.

* * * * *